Patented Apr. 21, 1936

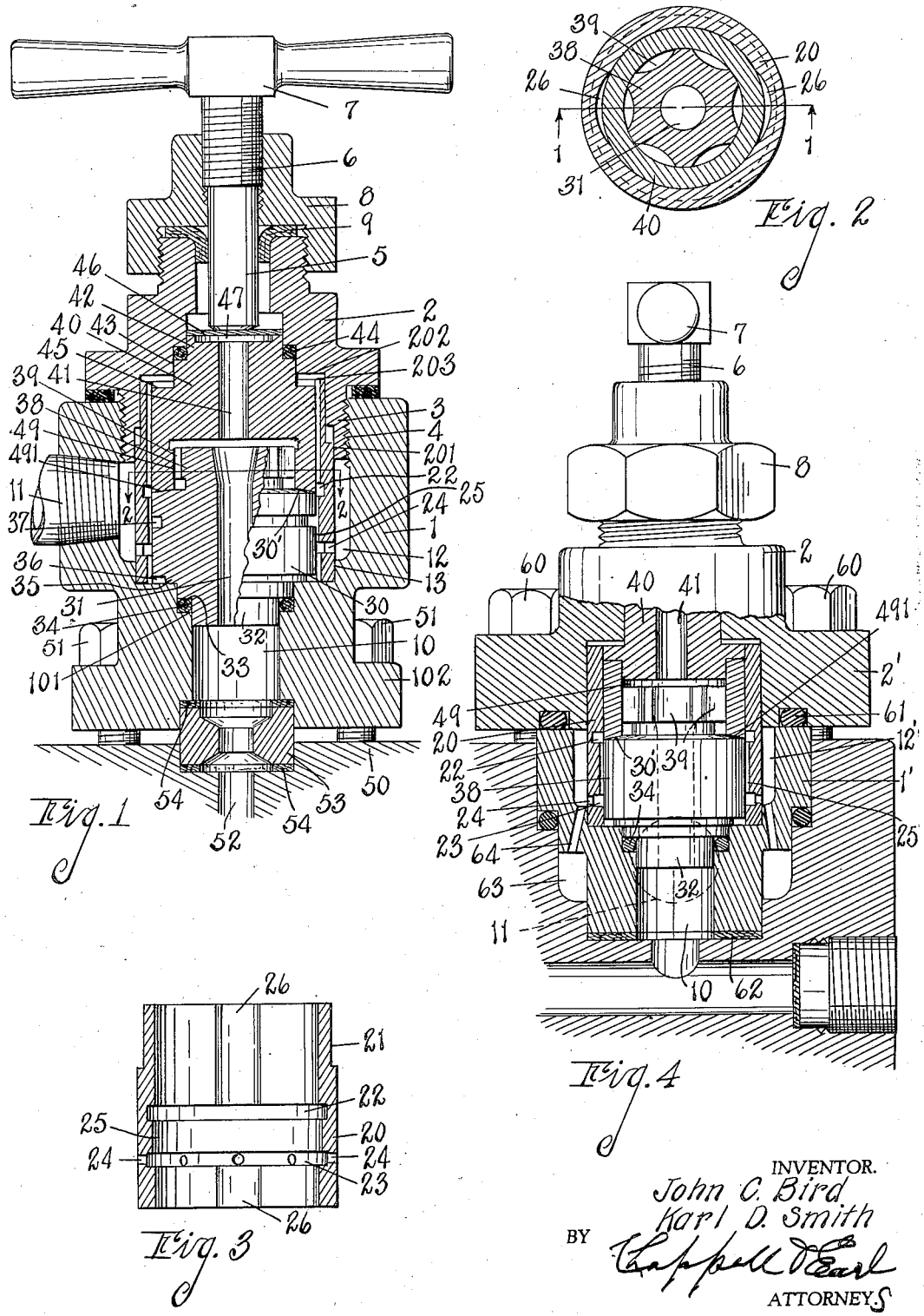

2,038,263

UNITED STATES PATENT OFFICE 2,038,263

VISCOLIZER VALVE

John C. Bird and Karl D. Smith, Battle Creek, Mich., assignors to Union Steam Pump Company, Battle Creek, Mich.

Application July 1, 1935, Serial No. 29,282

4 Claims. (Cl. 99—265)

The objects of this invention are:

First, to provide a viscolizer valve which in proportion to its size is easy of operation, it being possible to adjust the same quickly and satisfactorily when under pressure to the service required.

Second, to provide an improved construction of viscolizer valve which can be readily disassembled for cleaning.

Third, to provide improved construction and packing arrangement for such a valve.

Fourth, to provide such a structure in which the pressures are counterbalanced so far as practical.

Objects pertaining to details and economies of construction and operation will appear from the description to follow. We accomplish the objects by the structures illustrated in the accompanying drawing, in which:

Fig. 1 is a vertical central sectional view through a complete viscolizer valve attached to the wall of the pressure cylinder, taken on line corresponding to line 1—1 of Fig. 2.

Fig. 2 is a transverse detail sectional view through the valve proper and breaker ring, taken on line 2—2 of Fig. 1.

Fig. 3 is a detail vertical central sectional elevation of the breaker ring.

Fig. 4 is a vertical central sectional elevation view similar to Fig. 1, of a slight modification.

The parts will be identified by their numerals of reference which are the same in all the views.

1 is the cylindrical valve casing. 2 is the cap or head therefor provided with a screw flange 3 engaging threads 4 in the upper end of the cylindrical casing 1. An adjusting plunger 5 is screw-threaded at 6 and adjustable by handle 7. 8 is the gland of the stuffing box for the plunger 5 which is threaded to receive the threads 6 of the plunger 5. 9 is the cup-shaped gasket retained by the gland 8 which packs the plunger 5. The valve casing 1 is provided with the axial intake 10 and with a discharge pipe 11, the inner end of which connects to the annular discharge recess 12 formed within the central body of the casing 1.

20 is the breaker ring with a shouldered hub 21, with a receiving annular groove 22 for the discharge from the valve, and with an annular discharge passage 23 with radial apertures 24 leading therefrom. The space 25 between the annular recesses 22 and 24 is of slightly larger diameter than the valve hereinafter to be described, and affords a free passage for the "mix" that is being viscolized, after it has been viscolized. The breaker ring fits loosely within the valve casing and has slight clearance, permitting longitudinal movement, and is not clamped in any way by the valve casing and its head.

The breaker ring 20 is provided with longitudinal grooves 26 leading from top to bottom (see Fig. 2) and providing a connection for equalizing the pressure, there being two shallow grooves, as seen in Fig. 2. The breaker ring extends into the cylindrical bore 13 of the valve casing and into a similar bore 201 in the head 2, the hub fitting bore 202, the shoulder 203 between serving as a stop for the breaker ring 20.

30 is the valve, which in this case is stationary, and 40 is the valve seat, which in this case is movable in its relation to the valve. The valve has an axial bore 31 extending from end to end thereof and the valve seat 40 has an axial bore 41, so that there is a free opening for the passage of the fluid under pressure entirely through the valve and its seat and at both ends thereof. The valve has a hub 32 shouldered at 33 which extends into the intake opening 10. The intake opening 10 is shouldered at 101 to correspond to the shouldered hub and is provided with a packing 34 circular in cross section. The lower end of the valve contacts metal to metal with the lower end of the casing by shoulder 35. An annular groove 36 is formed in the lower end of the valve at the periphery. 37 is an annular groove toward the upper portion of the valve and is to facilitate the flow of the liquid or "mix" under pressure and insure distribution at all sides of the valve.

The valve 30 is provided with an upwardly-projecting hub 38 fluted at 39 for guiding the valve and the seat relatively to each other. The contact surface 30' of the valve is slightly conical in cross section. The valve seat 40 is provided with a hub 42 shouldered at 43 and fits within the bore 201 of the head 2 and is provided with a rubber gasket 44 which is circular in cross section. The valve seat 40 is shouldered at 45 with clearance between it and the top inner surface 202 of the cap or head 2. This permits slight movement of the valve seat sufficient for the adjustment in its action as a viscolizer. This is because the packing 44 is circular in form and compressible by the parts. The pressure will force the same into the lower outer corner, completely sealing the joint against the high pressure but at the same time permits the slight movement necessary of the seat to secure adjustment.

The valve seat 40 is recessed at 49 by a suitable bore to receive the hub 38 of the valve and guide the said valve and seat. There is sufficient clearance all around the hub to admit the fluid or "mix" under pressure and thereby counterbalances the valve and valve seat to that extent. The lower end of the valve seat is provided with a contact surface 491 corresponding to and serving as a seat for the valve face 30'. All other surfaces except that embraced at this point of contact are counterbalanced.

A steel disk 46 is under the end of the plunger 5 which is slightly rounded at the contact point. The valve seat is recessed at 47 under this disk 46 so that there is a slight yielding of this spring disk, which is sufficient spring action for the proper action of the viscolizer valve. Without this the action pulsates slightly.

The valve casing 1 is secured to the wall 50 of a pressure cylinder or pump by cap screws 51 through flange 102 thereof. The intake passage 52 is connected to the intake 10 of the valve by the connection 53, which is provided with gaskets 54, 54.

The operation appears from examination. The "mix" is introduced under pressure through the passage 52 into the intake 10 of the valve and passes upwardly through the valve at 31 and through the valve seat at 41, filling all the spaces within the valve between the packings 34 and 44, so that the whole valve is effectively counterbalanced by heavy pressure on the outside. The pressure is delivered outwardly in the valve seat and down into and completely fills the chamber of the valve seat within which the hub of the valve extends, consequently producing, so far as the valve is concerned, a complete counterbalance of pressure except as to the contact surfaces of the valve and seat.

When the pressure is turned on, the valve seat is screwed down by the handle 7. It operates and obstructs to the required pressure at only the point of contact of the inner periphery of the valve seat with the valve. When this is completely closed, it of course presents the full resistance to the handle 7. When it is open in the slightest degree, the pressure is at once relieved, when the "mix" enters the space between the valve and the valve seat, so that with this particular arrangement, with the valve completely counterbalanced, it is only necessary to control the pressure completely at the very limited area at the point of contact, and because of that fact it is possible to adjust the valve readily because the pressure is much less than that which would be generated if the pressure acted upon the entire valve face or contact area in place of this limited area.

In Fig. 4 we show a modified form in which our viscolizer valve is connected to discharge inside of the wall of the pressure cylinder. Here the valve casing 1' is cut off square at the top and the top of the casing 2' is secured by cap screws 60. A rubber gasket 61, round in cross section, is introduced and the parts are clamped in place. The valve casing is introduced into a cavity bored inside the wall of the pressure cylinder, and a flat gasket 62 is introduced at the bottom. An annular recess 63 is cut around the same at the bottom to connect to the discharge 11', indicated by dotted lines in Fig. 4. This recess 63 is connected by passages 64 with the annular space 12' in the valve casing. The valve seat 40 is made up of separate parts which, when assembled, are practically the same as in Fig. 1.

We desire to claim our invention broadly and specifically, as pointed out in the appended claims.

Having thus described our invention, what we claim as new and desire to secure by Letters Patent is:

1. The combination of a valve casing of cylindrical bore, a breaker ring within the casing, with annular grooves and radial perforations for the passage of fluid, loosely supported in the bore of the valve casing, a valve with central bore adapted to rest at the bottom of the casing and provided with a shouldered hub fitting corresponding shoulders in the intake of the valve casing, with a packing cylindrical in cross section between said shoulders, the valve being adapted to seat metal to metal within the casing and with annular grooves for the distribution of the liquid or "mix" at all sides thereof, a fluted guiding hub at the upper end of the valve with conical valve facing, a valve seat cylindrical in form within the valve casing and breaker ring, having an upwardly-projecting shouldered hub, with packing ring of circular cross section adapted to close the space and permit movement of said valve seat, a recess in the valve seat for the hub of said valve, the valve seat being provided with a contacting surface corresponding to the valve and accurately seating thereon, a screw plunger, a spring disk between the end of said plunger and the valve seat, and a stuffing box surrounding the said plunger.

2. The combination of a valve casing of cylindrical bore, a breaker ring within the casing, with annular grooves and radial perforations for the passage of fluid, loosely supported in the bore of the valve casing, a valve with central bore adapted to rest at the bottom of the casing and provided with a shouldered hub fitting corresponding shoulders in the intake of the valve casing, with a packing cylindrical in cross section between said shoulders, the valve being adapted to seat metal to metal within the casing and with annular grooves for the distribution of the liquid or "mix" at all sides thereof, a fluted guiding hub at the upper end of the valve with conical valve facing, a valve seat cylindrical in form within the valve casing and breaker ring, having an upwardly-projecting shouldered hub, with packing ring of circular cross section adapted to close the space and permit movement of said valve seat, a recess in the valve seat for the hub of said valve, the valve seat being provided with a contacting surface corresponding to the valve and accurately seating thereon, and means to adjust said valve and valve seat.

3. In a viscolizer valve, the combination of a cylindrical casing, a breaker ring or shell within the casing, cylindrical valve members constituting a valve and seat disposed within the breaker ring, connections to the center of said valve and valve seat, seating surfaces at the periphery of said valve and seat, connections from the source of pressure to said valve to counterbalance the same except at the contacting surface, and means for adjusting the valve and seat relative to each other to permit the escape of liquid or "mix" radially outward whereby the high point of pressure is at the inner margin of a circular area.

4. In a viscolizer valve, the combination of a cylindrical casing, cylindrical valve members constituting a valve and seat, connections to the center of said valve and valve seat, seating surfaces at the periphery of said valve and seat, connections from the source of pressure to the said valve to counterbalance the same except at the contacting surface, and means for adjusting the valve and seat relative to each other to permit the escape of liquid or "mix".

JOHN C. BIRD.
KARL D. SMITH.